Sept. 22, 1970  G. L. GRIMWOOD  3,530,351

CONTROL FOR INDUCTION MOTORS

Original Filed Nov. 20, 1962  2 Sheets-Sheet 1

—FIG.1.—

INVENTOR:
GEOFFREY LUTHER GRIMWOOD
BY
Braun, Schuyler & Burridge
ATTORNEYS

Sept. 22, 1970　　　　　G. L. GRIMWOOD　　　　　3,530,351
CONTROL FOR INDUCTION MOTORS
Original Filed Nov. 20, 1962　　　　　　　　　　　2 Sheets-Sheet 2

INVENTOR:
GEOFFREY LUTHER GRIMWOOD
BY
Browne, Schuyler & Burridge
ATTORNEYS

United States Patent Office 3,530,351
Patented Sept. 22, 1970

3,530,351
CONTROL FOR INDUCTION MOTORS
Geoffrey Luther Grimwood, Almondsbury, England, assignor to Thomas Broadbent & Sons Limited, Huddersfield, England, a British company
Continuation of application Ser. No. 238,844, Nov. 20, 1962. This application Aug. 15, 1967, Ser. No. 663,921
Claims priority, application Great Britain, Nov. 21, 1961, 41,517/61
Int. Cl. H02p 7/40
U.S. Cl. 318—229                           4 Claims

ABSTRACT OF THE DISCLOSURE

Control apparatus and method for high inertia loaded asynchronous induction motors such as centrifuges in refineries, chemical plants and similar high inertia loads. Variable impedance devices in at least two phase lines feeding the motor are controlled in such a way that when the motor is running at any selected speed the impedance of the variable impedance devices is at a maximum and minimum power is delivered to the motor when operating at that speed. When the motor is running at a speed below a selected speed, a voltage proportional to speed is compared with a reference voltage to produce an error signal which is used to reduce the impedance of the variable impedance devices to thereby supply more power to the motor to bring it up to the selected speed. As the motor reaches the selected speed the error signal is reduced so at the selected speed the impedance of the variable impedance devices is again at a maximum and minimum power is delivered to the motor. The high inertia load on the induction motor is sufficient mass to increase the time constant of the mechanical part of the system to where it is substantially greater than the time constant of control circuit so that instability does not arise. Consult the specification for other details and features.

---

Figure 1:
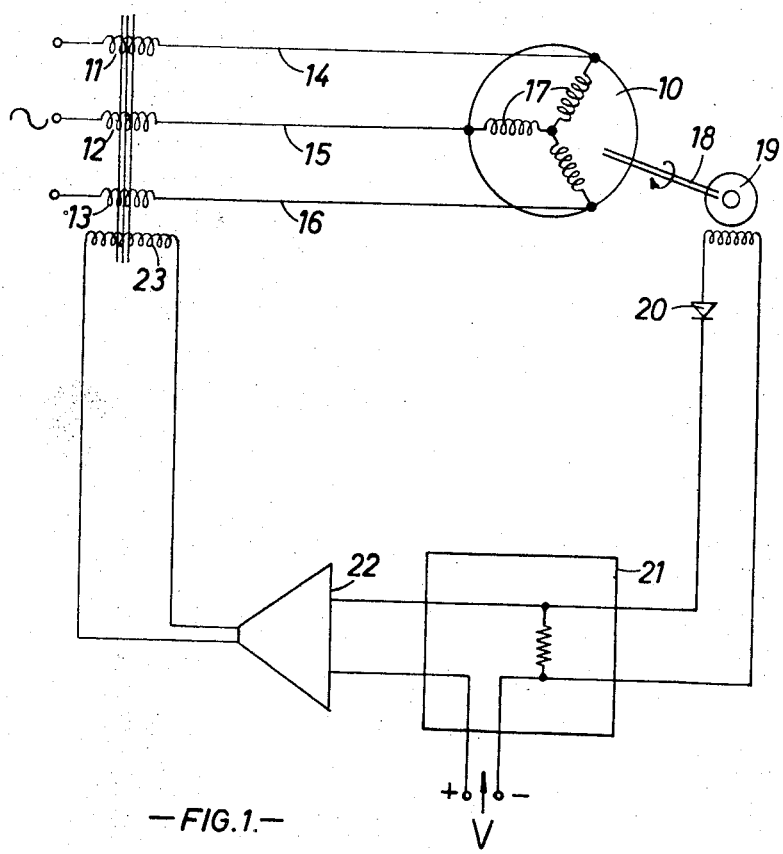

This is a continuation of application Ser. No. 238,844 filed Nov. 20, 1962, now abandoned.

The present invention relates to asynchronous or non-synchronous induction motors for driving centrifuges such as are used in the refining of sugar, and chemical products and similar high inertia loads.

In order to avoid undue power loss during the acceleration of centrifuges and to provide the maximum power recovery whilst breaking, it is customary to run the centrifuge drive motor through a series of near synchronous speed stages, e.g. through speeds of 375; 750; 1000 r.p.m. For this purpose the motor may be provided with one winding for the first two speed stages and a second winding for the third stage.

In addition, it is necessary to run the centrifuge at a much lower speed, say at about 50 r.p.m., for ploughing out the product after completion of the centrifuging operation. This, in the past, has been done by feeding a separate low frequency supply to a selected motor winding. The special supply has been provided by a frequency converter which in many installations may cost from £600 to £1,400. The frequency convertor may serve as many as six or eight motors but it is an expensive item if required for only one centrifuge, and in any case a fault in the convertor may render all of its associated centrifuges inoperative.

The main feature of the present invention resides in the elimination of the frequency converter and in providing, in its place and without stabilization, regulating devices in at least two of the phases feeding a selected winding of the motor of a high inertia drive. These devices reduce the voltage and power supplied to the selected motor winding, reduce the centrifuge drive motor torque and thus exercise control over the speed and rate of acceleration of this motor. The preferred devices are saturable reactors with main windings connected in the motor circuit and with control windings interconnected in an associated circuit. When the current delivered to the control winding is a maximum the main winding offers low reactance to the motor current, and as the control current reduces so the reactance increases until, with minimum control current, the reactance reduces the motor current to prevent acceleration.

The motor is preferably of the "squirrel-cage" rather than the slip-ring type.

The devices, such as saturable reactors, are controlled by a tacho-generator/comparator/amplifier circuit. The tacho-generator driven by the centrifuge drive motor provides an output voltage that is a function of the motor speed. This voltage is compared with a reference voltage in the comparator circuit and the difference amplifier by the amplifier and used to supply current to the control windings of the saturable reactors. Thus, when the centrifuge speed is very low, the tacho-generator output is near zero and a near maximum amplifier output current supplies the saturable reactor control windings, thus reducing the main winding reactance to a negligible value and allowing the centrifuge drive motor to accelerate. This motor acceleration increases the tacho-generator output, reduces the amplifier output, increases the saturable reactor reactance and reduces the motor power until no further acceleration occurs beyond the selected speed, e.g. 50 r.p.m. at which the amplifier output is at the desired minimum.

This use of a tacho-generator, comparator-amplifier, saturable reactor assembly has been previously applied in relation to electronic control engineering, and has been discussed in relation to electric power engineering, but in general has been considered unsatisfactory in relation to normal industrial induction motor drives for two reasons. Firstly, for industrial drives the system time constants are necessarily such that they produce instability in the control of speed. Secondly, the industrial induction motor would suffer very high losses if subjected to such operation at speeds much below the normal synchronous speed. The present invention takes advantage of the fact that the high inertia load, inherently present in centifuges and other arrangements, removes these disadvantages, firstly by increasing the time constant of the mechanical part of the system so that speed instability does not arise, and secondly by providing the condition of comparatively low motor loss rate when the motor is operating at any constant speed below its synchronous speed. This latter factor applies because normal industrial motors produce all their losses during constant speed operation under "full load conditions," and very little during acceleration. Centrifuge motors produce all their losses during acceleration and braking, and very little during any constant speed operation (as the power needed to spin a centrifuge is normally very small).

The present invention permits of a number of other advantages as follows:

(1) It can be used to make a centrifuge motor, with a given frequency of supply, run at a speed substantially different from the synchronous speed, e.g. a motor supplied with 50 cycles current can be made to run stably at 1200 r.p.m. instead of 1500 r.p.m.

(2) For the feeding of massecuite into a centrifuge it is an advantage to run the motor at a controlled speed, e.g. 250 r.p.m. This can readily be obtained with the present invention (apart from the ability to run at a ploughing speed of, say, 50 r.p.m.) by a minor control circuit adjustment.

(3) For the purpose of running up of the motor and switching it through the speed stages, a rather expensive control system, costing something of the order of £100, is customarily used. This switching can be made much more inexpensively with the aid of the tacho-generator, since the voltage obtained therefrom is a function of speed and can therefore be employed in controlling an inexpensive control gear to switch the motor at the required speeds.

(4) A further advantage of this invention is that the amplifier can be controlled to supply current to the saturable reactors in a manner to control the shape of the speed torque curve to give a linear or other desired speed time curve.

As previously stated, the invention is applicable to high inertia drives, and the particular example quoted is that of centrifuge. However, the invention is equally useful for industrial induction motors providing they have a high inertia loading, i.e. if the motor has permanently secured thereto a fly-wheel of sufficient mass to render its time constant sufficiently dissimilar from that of the contrlo gear to avoid instability. Although the provision of a fly-wheel will involve a certain increase in motor losses, this may be worth while to obtain the advantages listed above.

Silicon controlled rectifiers may be used as the control or regulating devices in place of the saturable reactors. These require adjustments in the comparator and amplifier circuit to convert the voltage output of the tacho-generator to a proportional phase displacement of the control signal to the silicon controlled rectifier triggers instead of the current amplitude signal to the control windings of the saturable reactors.

Figure 2:
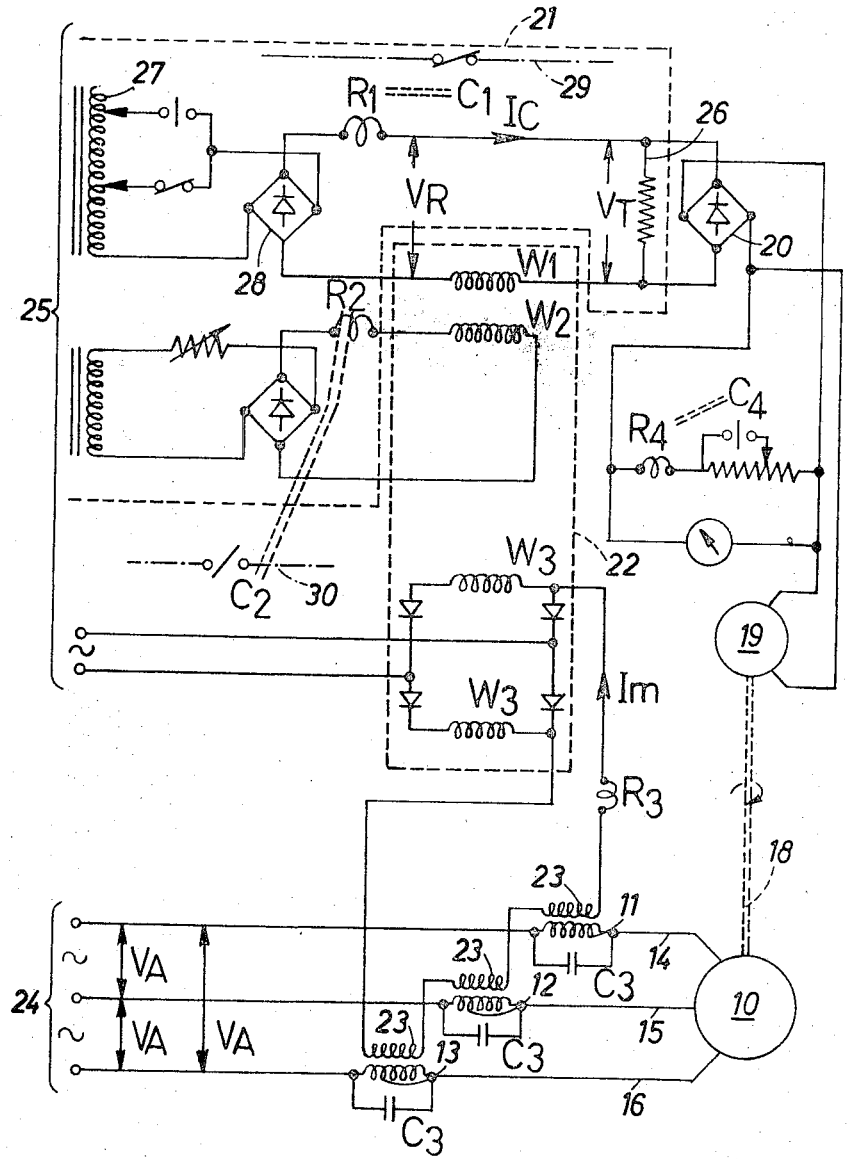

The invention will now be further described by way of example with reference to the accompanying drawings wherein:

FIG. 1 shows schematically the invention applied to the control of an induction motor, and FIG. 2 shows the same control scheme but in greater detail.

The illustrated embodiment employs saturable reactors as the control device, but, as previously stated, these can be replaced, with suitable modification of the associating circuit, by silicon controlled rectifiers.

Referring to the first figure, an inertia loaded induction motor 10 of the "squirrel-cage" type is illustrated, but only the selected winding thereof which is used in the control of the invention has been shown; the remaining windings of the motor have been omitted for the sake of clarity.

The main windings 11, 12 and 13 of three saturable reactors are connected in series one in each of the three lines 14, 15 and 16 whereby a 3-phase A.C. supply is fed to the selected winding 17 of motor 10, this winding being shown connected in star. Delta and other connections for the winding are, of course, possible.

A mechanical coupling 18 extends from motor 10 to tacho-generator 19 and the electrical output from this piece of equipment is fed by means of a rectifier 20 into one side of a comparator 21 which is provided with a reference voltage V. The output of the comparator 21 is fed to an amplifier 22 and the signal therefrom is connected to one or more control windings 23 of the windings 11, 12 and 13 of the saturable reactors.

It will be appreciated that the voltage generated by the tacho-generator 19 fed to the comparator 21 will be directly related to the speed of the tacho-generator 19 and hence to the speed of the motor 10. Consequently when the desired speed of the motor 10 and the tacho-generator 19 is reached, the output of the latter, when compared in the comparator circuit with the selected reference voltage V, will reduce the amplifier output to a minimum, thus making the reactance of the windings 11, 12 and 13 a maximum, so that the current being fed through the supply lines 14, 15 and 16 to the motor 10 is prevented from increasing. On the other hand, if the speed of the centrifuge is lower than that required, then the output from the tacho-generator will be low and as a result a high amplifier current is applied to the control windings 23 of the saturable reactors, thereby reducing the reactances in each of the main supply lines 14, 15 and 16, and enabling the speed of the motor 10 to be increased.

Referring to the more detailed illustration of the scheme shown in the second figure, the same reference numerals are employed, as far as possible, as on the first figure. The main power supply is referenced 24 and the auxiliary control supplies are marked 25.

The output from the tacho-generator 19, mechanically coupled at 18 to the inertia loaded induction motor 10, is delivered to a rectifier 20 and a voltage proportional to the motor speed appears across a small loading resistance 26 connected across the rectifier output. From the A.C. control supply source 25, a transformer 27 delivers a preset reference voltage to a rectifier 28 which is also connected across the load resistance 26. Thus, the closed circuit consisting of transformer 27 and rectifier 28 forms a comparator 21 and applies a reference voltage $V_R$ against the tacho-generator voltage $V_T$ and, assuming the former to be greater, a current $I_c$ flows in the loop between rectifiers 20 and 28 proportional to the difference between the two voltages. The current $I_c$ can only flow in the direction shown.

A control winding $W_1$ of a magnetic amplifier 22, of the self-excited type, is included in the loop between rectifiers 20 and 28 so as to carry the current $I_c$. This current is amplified considerably by known magnetic amplifier means and appears in the output windings $W_3$ of amplifier 22 as current $I_m$. The amplifier has a winding $W_2$ to which a small bias is connected from supply 25 to enable adjustments to be made for ensuring the best amplification.

The main three phase saturable reactor windings 11, 12 and 13 are connected in the power lines 14, 15 and 16 to the inertia loaded induction motor 10, and the D.C. saturating or control coils 23 are connected in series (as shown) or in parallel across the output of amplifier 22 so that they carry the current $I_m$.

The choice of the magnetic amplifier 22 and saturable reactors is determined by the need for reliable interlocking. The prevention of premature acceleration beyond ploughing and feeding speeds for a centrifuge and the provision of a reliable signal to initiate ploughing and feeding are considered to be the important interlocks.

When the saturable reactors are receiving the maximum value of $I_m$, the induction motor 10 is delivering maximum torque. Thus, any failure or reduction in $I_m$ will reduce the motor torque. As it is not possible to increase $I_m$ beyond its maximum value, any fault condition in the equipment that reduces $I_m$ is not troublesome and this part of the equipment "fails to safety." Thus, a failure of the amplifier 22 would cause the saturation level of windings 23 to drop and the motor torque to reduce, so that interlocking of these parts of the circuit is unnecessary.

A similar condition applies to the reference supply 25. It is this supply that provides the power for coil $W_1$ of amplifier 22, and in the event of a failure in any of the reference components (transformer 27 or rectifier 28), $I_c$ and $I_m$ will drop and reduce the motor torque.

This is not the case however with the tacho-generator voltage, as the equipment depends upon the rising value of this voltage to reduce the current through the amplifier control coil $W_1$ and so reduce the motor power as the control speed is approached. A relay $R_1$ is therefore fitted in series with the comparator circuit to interlock against the failure of the tacho-generator and its associated components. In the event of such a failure the reference voltage $V_R$ only is applied to the series circuit consisting of relay $R_1$, resistance 26 and winding $W_1$ and the current flowing under this condition is sufficient to energize $R_1$ and provide the required interlock signal to open a pair of normally closed contacts $C_1$ in an interlock circuit 29. As the centrifugal speed during normal operation does not fall below the minimum ploughing speed of about 40 r.p.m., the condition of "power on" with the main motor stationary is considered a fault condition for the purposes of interlocking.

Failure of the $R_1$ relay coil itself will cause an open circuit in the feed to winding $W_1$ and reduce both $I_c$ and $I_m$ to zero.

A similar series interlock relay $R_2$ is connected in the bias supply to the magnetic amplifier winding $W_2$. Any failure of this supply gives an interlock signal to close a pair of normally open contacts $C_2$ of another interlock circuit 30.

It is the combination of relays $R_1$ and $R_2$ that prevents any component failure causing premature acceleration beyond the controlled ploughing and feeding speeds.

The plough release signals are derived from a relay $R_3$ in the output of amplifier 22. When the centrifuge is braking mechanically from a speed above that selected for ploughing and with the brake valve under the control of a relay $R_4$ and contacts $C_4$ the complete servo-control scheme is energized and the minimum value of $I_m$ flows. Meter 35 is calibrated in r.p.m. and being connected across tachogenerator 19 gives the user of the machine the instantaneous speed of the motor spindle. As the motor speed passes through the plough speed (preset with a slider tapping on transformer 27), the value of $I_c$ and $I_m$ increases rapidly to exercise torque control on the motor and prevent further deceleration. It is this increase in $I_m$ that energizes relay $R_3$ and gives the signal to release the plough discharger into the basket. If current $I_m$ does not rise for any reason, the plough remains in the safe zone. The inherent circuit characteristics are thereby used to convert the slowly falling tachometer signal to an interlocked and rapidly rising current signal of increased power.

A similar interlock occurs but operates by the falling value of $I_m$ to permit feeding as the motor accelerates after discharging to the preset feeding speed.

I claim:

1. In a control apparatus for a multiphase asynchronous electrical induction motor having a plurality of windings, and a high inertia load, a tachogenerator, a comparator, an amplifier, regulating devices, and an interlock system, means mechanically coupling said tachogenerator to the motor whereby the generator output voltage is a function of the motor speed, means for applying said output voltage in opposition against a reference voltage produced by said comparator to produce a control signal current, means for applying any control signal current so produced to said amplifier for amplification thereby, means connecting said regluating devices in at least two of the phases of the supply feeding a selected one of said windings, means for applying any control signal current from said amplifier to said regulating devices to modify the power supplied to said motor, and said interlock system connected in the circuit of said regulating devices and adapted to operate an element associated with the induction motor when the current being fed to said regulating devices alters in magnitude rapidly, said high inertia load having sufficient mass to render the time constant thereof sufficiently dissimiliar from that of said control apparatus to avoid instability.

2. A control as set forth in claim 1 wherein said interlock system includes a relay.

3. In a control for a high inertia loaded multiphase asynchronous electrical induction motor having a plurality of windings, a tachogenerator, a comparator, an amplifier, regulating devices, and an interlock system, means mechanically coupling said tachogenerator to the motor whereby the generator output voltage is a function of the motor speed, means for applying said output voltage in opposition against a reference voltage produced by said comparator to produce a control current corresponding to the difference between said output voltage and said reference voltage, means for applying said control current to said amplifier for amplification thereby, said regulating devices connected in at least two of the phases feeding a selected one of said windings, means for applying the ampified control signal from said amplifier to said regulating devices to cause said devices to modify the power supplied to said motor and said interlock system connected in the circuit of said reference voltage to remove that voltage in the event of a failure of the output of said tachogenerator.

4. A control as set forth in claim 3 wherein said interlock system includes a relay.

References Cited

UNITED STATES PATENTS

| 2,890,398 | 6/1959 | Jarvinen | 318—225 |
| 2,894,191 | 7/1959 | Charbonneaux | 318—229 |

ORIS L. RADER, Primary Examiner

G. Z. RUBINSON, Assistant Examiner

U.S. Cl. X.R.

318—513